Figure 3A:
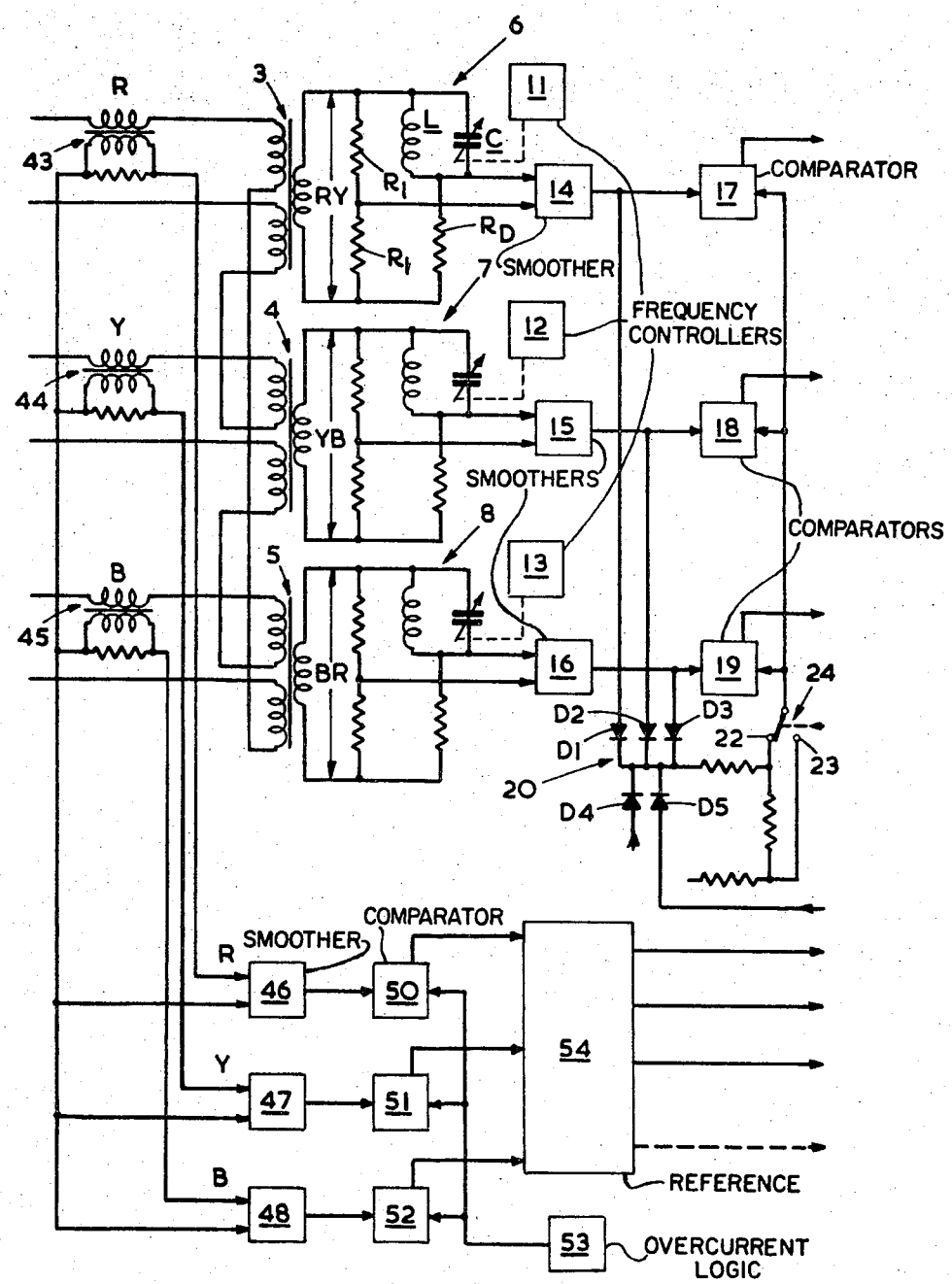

United States Patent
Paddison et al.

[15] 3,699,431
[45] Oct. 17, 1972

[54] SELECTOR CIRCUIT FOR DETERMINING FAULTS IN POLYPHASE TRANSMISSION SYSTEMS

[72] Inventors: Eric Paddison; Christopher George Wilson; Frederick Martin Gray, all of Stafford, England

[73] Assignee: The English Electric Company, London, England

[22] Filed: Dec. 10, 1969

[21] Appl. No.: 883,810

[30] Foreign Application Priority Data
Dec. 10, 1968    Great Britain..........58,554/68

[52] U.S. Cl.................324/51, 317/27 R, 317/36 TD
[51] Int. Cl. .............................................G01r 31/02
[58] Field of Search ...............324/51; 317/27, 36, 23

[56] References Cited

UNITED STATES PATENTS

| | | | |
|---|---|---|---|
| 2,986,674 | 5/1961 | Baude | 317/27 X |
| 3,192,442 | 6/1965 | Warrington et al. | 317/36 |
| 3,210,606 | 10/1965 | Calhoun | 317/27 X |
| 3,277,345 | 10/1966 | Waldron | 317/27 X |
| 3,488,559 | 1/1970 | Souillard | 317/36 X |
| 3,513,352 | 5/1970 | Souillard | 317/27 |
| 3,538,384 | 11/1970 | Crockett | 317/27 |
| 3,300,685 | 1/1967 | Zocholl | 317/36 TD X |
| 3,401,395 | 9/1968 | Neher | 324/51 X |
| 3,480,834 | 11/1969 | Billings | 317/36 TD X |
| 3,594,557 | 7/1971 | Anderson | 317/36 TD |

*Primary Examiner*—Gerard R. Strecker
*Attorney*—Misegades and Douglas, Keith Misegades and George R. Douglas, Jr.

[57] ABSTRACT

The invention provides a selector system for determining which phase or phases of a polyphase power transmission system are affected by a fault. The fault results in a fault current in the affected phase (phase-to-ground fault) or phases (phase-to-phase fault). To distinguish these changes from the existing phase currents due to normal loads, the quantities monitored are stored (phase and amplitude) and any changes in them are inspected to see whether a fault has occurred and, if so, what type of fault it is. Preferably, the "phase-to-phase" currents are the quantities monitored. The pattern of any substantial changes in these quantities establishes a fault pattern indicative of the nature of the fault. Means may also be provided for following developing faults. A measuring unit may be connected to the appropriate phase or phases following identification of the fault.

9 Claims, 4 Drawing Figures

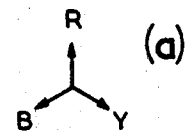
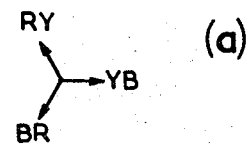
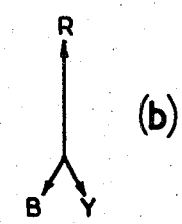
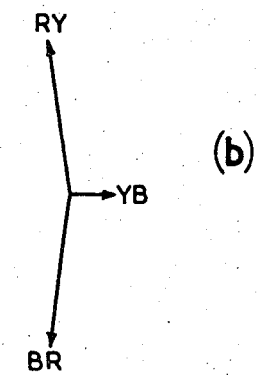
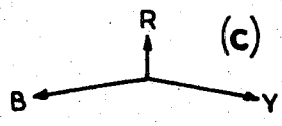
FIG.1  FIG.2

SELECTOR CIRCUIT FOR DETERMINING FAULTS IN POLYPHASE TRANSMISSION SYSTEMS

This invention relates to a selector circuit for determining faults in polyphase transmission systems, i.e., determining which phase(s) are affected by the fault.

In determining faults in polyphase systems two schemes have principally been used hitherto, i.e., a "full" scheme involving the use of six different relay elements both to identify the three possible line-ground faults and the three possible line-to-line faults and to measure the distance to the fault location, and a "switch" scheme involving, e.g., three elements for identifying the existence of such a fault, a single distance measuring element then being switched to the faulty phase to locate the particular fault. While the latter scheme is clearly an improvement on the former in so far as concerns economy of equipment, both schemes suffer from the disadvantage that they may make an incorrect selection of the faulty phase(s) as a result of their inherent determination of the amplitudes of the monitored quantities since under some circumstance, particularly in double end-fed lines or those sections which include a tee'd feeder, the currents in the second phases can each exceed the current in the faulty phase, thus masking the fault.

The main object of the present invention is to provide a selector circuit in which this difficulty is alleviated or overcome.

Thus according to the invention there is provided transmission system comprising means for monitoring electrical quantities associated with the various phases, means, connected to the monitoring means, for producing signals indicative of the differences between the vector values of said quantities before and during a fault, control means for establishing a fault pattern which is dependent on whether the individual signals are greater or less than a predetermined limit and means for identifying the type of fault from the fault pattern produced.

The electrical quantities monitored are preferably the line-to-line currents. The means for detecting changes may include bridge networks for receiving each of these quantities, each bridge having a tuned circuit in one arm and purely resistive elements in its other arms so that any change in the input will result in a transient output from the bridge.

The pattern of any such changes may be established by the control means by separately comparing the output from each bridge with a certain percentage of the maximum one of these outputs, as will be more fully described.

The selector circuit may be used in conjunction with a single measuring unit which is connected to the appropriate phase or phases when a fault occurs, under the control of the selector circuit, to measure the distance of the fault. The control means preferably include a memory to "hold" the fault pattern for a predetermined period long enough for this distance measuring unit to ascertain the zone in which the fault has occurred, and it may further include interlock circuits operable to lock-in the memory following a line-to-line fault and operable temporarily to release the memory following a line-to-ground fault so as to permit a fault evolving from line-to-ground to be identified, i.e., evolving to line-to-line to ground or even to a line-to-line fault involving two or three phases.

An over-ride circuit operable at very high levels of fault current may also be provided to by-pass the bridge networks and comparators, the operation of which may be confused at these levels by reason of the cores of the line current transformers being saturated. This over-ride circuit operates in dependence on instantaneous current values and may include further comparators for comparing each line current with a reference level, the memory circuit being fed by these latter comparators in the same way as described with reference to the control means should this reference level be exceeded.

Figure 3B:
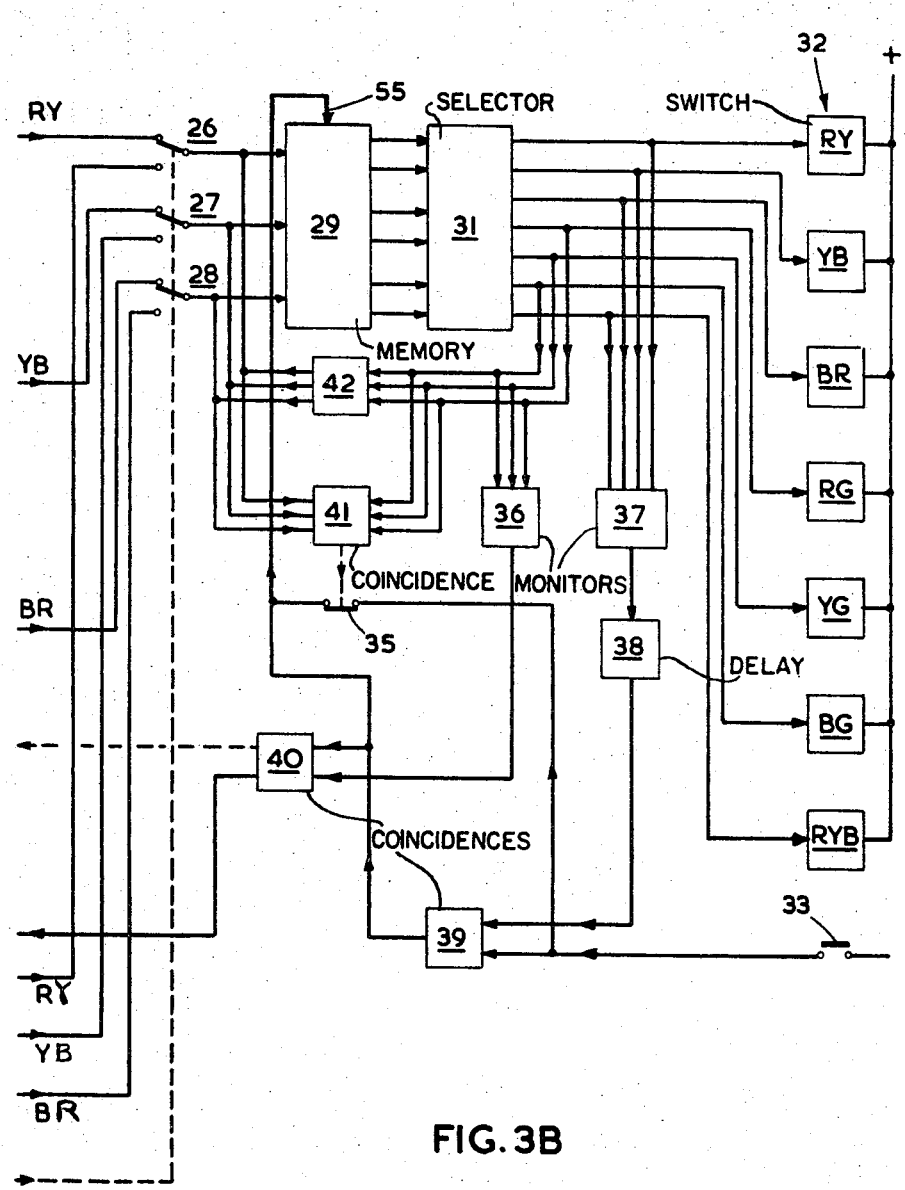

In order that the invention may be fully understood, one embodiment thereof will now be described, by way of example, with reference to the accompanying drawing, in which:

FIGS. 1(a), 1(b), and 1(c) illustrate line current vector quantities for normal, line-to-ground fault, and line-to-line states respectively;

FIGS. 2(a) to (c) illustrate the corresponding "line-to-line " current vector quantities; and FIGS. 3A and 3B together illustrate a block diagram of the selector circuit.

Considering FIGS. 1 and 2 first, it is preferred to use the "line-to-line" vectors to detect fault conditions, and therefore the conditions illustrated by FIGS. 2(b) and 2(c) are those which have to be detected. For a line-to-ground fault (e.g., RC, red-to-ground fault, FIG. 2(b)), there are two large levels, and it is found that the smaller of these is never less than 97 percent of the larger. For the line-to-line fault (e.g., YB, yellow-to-blue fault, FIG.2(c)), these levels change to give one large level together with two approximately equal levels of about 50 percent of the large level, and it is found that the larger of these two levels never exceeds 75 percent of the largest level. Thus to discriminate between these two types of fault in terms of the largest signal, a discrimination level of between 75 percent and 97 percent of the largest change of signal must be used to compare the other two changes of signals with. In this instance the mean level of 85 percent is employed as the criterion so that, by assuming that all levels higher than this be accorded the logical value '1 ' and all lower levels accorded the value '0 ' then, for a three phase system, the pattern shown in Table I is established by sampling the three line-to-line current vector changes.

TABLE I

| Fault | Logical Value of Vector Changes of Line-to-Line Currents | | |
|---|---|---|---|
| | RY | YB | BR |
| RG | 1 | 0 | 1 |
| YG | 1 | 1 | 0 |
| BG | 0 | 1 | 1 |
| RY | 1 | 0 | 0 |
| YB | 0 | 1 | 0 |
| BR | 0 | 0 | 1 |
| RYB | 1 | 1 | 1 |

The determination of this pattern, and the selection effected upon recognition of the pattern, thus forms the basis of this invention.

Referring now to FIGS. 3A and 3B the three line currents Red (R), Yellow (Y), Blue (B) are sampled and applied to the primary windings of transactors 3, 4, 5, the R current being mixed with Y in transactor 3 and with B in transactor 5, whilst the Y current is mixed with B in transactor 4. The voltage across the secondary of transactor 3 is thus proportional to the R line-to-Y line current and the voltage across the secondaries of transactors 4 and 5 are proportional to the line-to-line currents YB, BR, respectively.

These voltages are applied across bridge networks 6, 7, 8 each including two equal value resistors $R_1$ in one branch, with a parallel resonant circuit and a resistor $R_D$ equal in value to the dynamic impedance of this tuned circuit, in the other branch. Each tuned circuit includes an inductor L and a variable capacitor C which is automatically adjusted by a frequency control circuit 11, 12, 13, appropriate to each bridge, so that the tuned circuits are always in resonance at the supply frequency despite minor variations in this quantity. Each of the frequency control circuits 11 to 13 is arranged to be responsive to the phase difference between the signals across one of the two resistors $R_1$ and the tuned circuit L and C. A sudden change of frequency of the incoming signal results in the tuned circuit becoming temporarily inductive or capacitive, and the phase of the signal across it therefore varying with respect to the phase of the signal across the resistors $R_1$; and this phase change, after detection, is used to adjust the value of the capacitor C. The outputs from the three bridge networks 6, 7, 8 are rectified and smoothed in circuits 14, 15, 16 respectively, each of these circuits comprising a full-wave rectifier bridged by a parallel-connected capacitor and resistor in order to effect "peak" smoothing and achieve a fast response.

During steady load conditions, all the bridges are balanced and there are no outputs from them, any changes in frequency, which would otherwise de-tune the LC circuits and result in an output, being compensated for by the control circuits 11 to 13. Should there by any change in line conditions however, the change in line-to-line current will cause a change in bridge voltage resulting in an immediate change at the junction of the two resistors $R_1$. The tuned circuit cannot likewise respond immediately however and responds only slowly at a rate dependent on its time constant, e.g., about 50 milliseconds. Thus, there is a short transient output produced from the bridge, the initial amplitude being proportional to the vector change in the line-to-line current.

The (rectified) outputs from the bridges emanate from a source of low impedance and thus the capacitors in the appropriate smoothing circuits 14 to 16 charge rapidly to the peak value of this signal, the discharge time constant of these capacitors being made equal to the time constant of the tuned circuit so that the resulting d.c. transient corresponds to the envelope of the a.c. transient from the bridge. These outputs are applied separately to one input of three comparators 17, 18, 19 and are also applied to a "maximum" selector circuit 20.

This selector circuit comprises three like-poled diodes D1, D2, D3 to which the outputs from the smoothing circuits 14 to 16 are separately applied so that only the maximum instantaneous output from these circuits appears at the common junction of these diodes, this value appearing across a potential divider having one terminal contact 22 at which 0.85 (85 percent) of this value appears and another terminal contact 23 at which 0.25 of this value appears. A switch 24 has an arm movable between these terminals to as to present the appropriate value to the other input of the comparators. A bias voltage corresponding so a change in line-to-line current of one quarter times full load is applied through diode D4 to the common junction, so that there is no attempt at phase selection below this level, and a further bias voltage equivalent to a change of 5 times full load is applied through diode D5 under circumstances (described below) which may give rise to a fault evolving from one type to another, the switch 24 also being changed-over from terminal 22 to terminal 23 under these conditions.

The comparators 17, 18, 19 thus each compare the individual outputs from smoothing circuits 14, 15, 16 with 85 percent of the maximum one of these outputs, the output from these comparators being in digital form i.e., high (1) if the input from these circuits exceeds the input from the maximum selector and low (0) if this is not the case.

The digital outputs from the comparators are applied through switches 26 (RY), 27 (YB) and 28 (BR) to a memory circuit 29, these switches each having an arm movable to present an alternative input to the memory under severe overcurrent conditions to be described.

The memory circuit 29 comprises various logic circuits and three bistable circuits, of conventional type. It is arranged so that in the absence of a signal on a "-hold" or "lock" line 55, the three bistable circuits follow the signals from the switches 26 to 28. However, when a true signal is applied to line 55, the bistable circuits are isolated from the signals from the switches 26 to 28, and retain the states which those signals had when the signal on line 55 first appeared until the signal on line 55 ends.

The memory circuit 29 feeds a selector 31 which is operative to determine the type of fault by identifying the digital pattern of the inputs presented to the memory (cf. Table I). An output signal thus appears on an appropriate one of the seven outputs from the selector, energizing a corresponding switch 32 operable to switch a measuring unit (not shown) to the faulty phase(s). Upon the measuring unit being energized its starter contact (33) is closed for faults occurring within the measuring range after an operating time of, say, 10 milliseconds in order to receive a complete sample of the pattern of information, and the information in the memory circuit 29 is held by the signal applied on line 55 via normally closed contact 35. This data is held for a predetermined period in order to enable the measuring unit to measure correctly the zone in which the fault has occurred and give its associated circuit-breaker time to operate, this step being necessary because, of course, the transient signals from the tuned circuits in the bridge are only present for a short time, e.g., 50 milliseconds. If the fault recognized by this unit is in an adjacent section covered by another relay and is cleared by the other relay then the contact 33 drops out, the memory circuit 29 is unlocked and further selections may be made, but should the fault be covered by this relay the memory circuit remains locked until this relay is reset.

Interlock circuitry is also provided for recognizing an "evolving" fault. For example, a red-to-ground fault (RG) may evolve after several cycles to a red-to-yellow-to-ground fault, but since the original RG fault still exists the measuring unit will remain switched to detect the latter so that the extension of this fault will remain undetected.

More particularly, the interlock circuitry for dealing with this problem includes two monitoring circuits 36, 37 operable in response to any line-to-ground fault, and any line-to-line and line-to-line-to-line (three phase) fault, respectively. This circuitry is only operative to recognize faults evolving from line-to-ground to line-to-line and not vice versa.

Thus, considering firstly a line-to-line fault the circuit 37 operates to activate a delay network 38 so that after, say, 5 milliseconds an input is presented to a coincidence circuit 39 whereupon, immediately the starter contact 33 is closed, an output is developed positively to seal-in the memory. This condition may only be interrupted by the starter contact 33.

Considering now a line-to-ground fault, the appropriate line-to-ground output from the selector 31 is presented to the monitoring circuit 36, and this operates to drive a coincidence circuit 40 whose other input comes from switch 33 via switch 35. This circuit 40 in turn actuates the switch 24 so that only 25 percent of the maximum value of the outputs from circuits 14 to 16 is presented to the comparators 17 to 19 and, at the same time, the bias on the maximum selector circuit 20 is raised to 5 times full load through diode D5.

The reasons for these changes are as follows. Following a line to ground fault it is necessary to prevent any load changes causing false selection. Also, only a fault evolving to a line to line or three phase fault must be permitted to release the memory. This latter requirement is met by lowering the output of the "maximum" selector 20 from 85 percent to 25 percent following a line to ground fault, making use of the fact that all three outputs are above 25 percent of the maximum for line to line and three phase faults. As the faulty phases on a line to line fault and three phase faults always exceed 5 times full load, a bias of 5 times full load is also applied. This ensures that the comparator reference level cannot fall below 5 × 0.25 × full load, so that load changes will not give rise to false "evolve" faults.

In addition, the outputs from the comparators 17 to 19 are monitored and presented to a coincidence circuit 41 together with the appropriate line-to-ground output from the selector. It will be recalled that a line-to-ground fault is defined by a pattern including two 1 'digits and one '0'. Should a fault now evolve to line-to-line or three-phase then the '0' digit will change to '1' and in this event the coincidence circuit 41 is energized to break the contact 35 for a short period. In the circuit 41, the RG input is compared with YB from the comparator, the YG input with BR, and the input BG with RY. With the contact 35 broken, the memory locking signal is interrupted, thus permitting a fresh selection to be made.

With a fault which evolves from line-to-ground (e.g., RG) to line-to-line-to-ground (e.g., RYG), it is possible for the apparent information presented to the memory circuit 29 to indicate the additional line-to-ground fault only, that is YG, by reason of the arc impedances involved. To obviate this false indication, a logic circuit 42 is provided, operable in dependence on the line-to-ground outputs from the selector 31. Specifically, with the starter contact 33 still closed from the original fault, if the line-to-ground fault postulated (RG) is immediately followed by what appears to be another line-to-ground fault (YG) then the logic circuit 42 drives the memory circuit 29 in a manner such that the correct fault conditions are selected and indicated (RY).

A further protective measure provided in this circuit is an overcurrent over-ride, the purpose of which is to avoid malfunction of the bridge networks and comparators for line-to-line faults affecting two or three phases and involving currents at such high levels that the line current transformers saturate, resulting in a high proportion of harmonic components. This condition is of no significance with line-to-ground faults since the monitored line-to-line currents affected, e.g., RY and RB for a red-to-ground fault, change in one and the same manner, but with line-to-line faults more than one line current transformer is involved and they may be subjected to different degrees of saturation.

This overcurrent circuit includes three auxiliary current transformers 43, 44, 45 coupled to the Red, Yellow and Blue phases, respectively, the outputs from which are separately rectified and smoothed in circuits 46, 47, 48 which each comprise a full-wave rectifier connected to a surge suppression circuit and level detector, e.g., as described in our British Pat. No. 1,162,206 corresponding to our copending U.S. application Ser. No. 637,831, filed May 11, 1967, now U.S. Pat. No. 3,487,266. The outputs from these circuits are applied to three comparators 50, 51, 52 where they are each compared with a reference signal from a reference source 53, the outputs from these comparators being in digital form, i.e., high (1) if the input exceeds the reference level and low (0) if the input lies below this level. The reference level is determined by the current value just acceptable by the line current transformers without saturation, e.g., a value of twelve times full load might be a convenient level.

The digital outputs from these comparators are applied to an "overcurrent" logic circuit 54, the existence of a line-to-line fault exceeding the reference level from source 53 being indicated when two of these outputs are high where two phases are involved, with all three of the outputs being high where all three phases are involved. The logic circuit 54 is operative to change-over the contacts of switches 26, 27, 28 when any two outputs from the comparators 50 to 52 are high so that the memory circuit 29 now receives its input from the overcurrent logic circuit 54 instead of the comparators 17 to 19 in the main phase selector, an input being applied to the switch 26 when the red and yellow phases exceed the reference level and being applied to the switches 27 and 28 when the yellow and blue phases, and the blue and red phases, respectively, exceed this level. Phase selection is then carried out as before, the memory being locked-in because, of course, the overcurrent circuitry is not operative for ground faults from which line-to-line faults may evolve.

Although the operation of this circuit has been described with reference to the particular embodiment illustrated, various modifications may readily be made. For example, in order to ensure that the frequency control circuits are set to the system frequency when there is no current flow in the line current transformers, small reference signals may be injected into the bridge networks 6, 7, 8; in particular, this may take the form of line-to-line voltage RY, YB, BR applied to the appropriate bridge networks by voltage transformers. Further, the bridge networks themselves have been shown and described as having in each branch components which exhibit equal value resistance, but resistance ratios other than 1 : 1 may of course alternatively be employed provided that the bridges are balanced.

We claim:

1. A selector circuit for determining faults in a polyphase transmission system, comprising means for monitoring electrical quantities associated with the various phases, means connected to the monitoring means for retaining pre-fault values of the quantities in terms of both amplitude and phase and including means for vectorially subtracting the pre-fault values of the quantities from the fault values of the quantities to produce signals indicative of the differences in amplitude and phase relation between the pre-fault and fault values of the quantities, control means connected to the signal producing means for establishing a fault pattern which is dependent on whether the individual signals are greater or less than a predetermined limit and means connected to the control means for identifying the type of fault from the fault pattern produced.

2. A selector circuit according to claim 1, wherein the signal producing means comprises a bridge having its output connected to the control means, the bridge having zero output when the quantities are vectorially constant and comprising a tuned circuit and a resistive component, whereby on the occurrence of a fault the voltage across the tuned circuit is related to the vector values of the quantities before the occurrence of the fault and the voltage across the resistive component is related to the existing vector values of the quantities.

3. A selected circuit according to claim 1, wherein the signals are applied to respective comparators together with a reference signal corresponding to the predetermined limit and equal to a predetermined fraction of the greatest of the signals plus a predetermined bias level, the outputs of the comparators being of binary digital form and forming the fault pattern.

4. A selector circuit according to claim 1, wherein the fault identifying means are adapted to cause a distance-to-fault measuring unit to be connected to the faulty phase or phases, and including a memory fed with the fault pattern and responsive to the operation of the measuring unit to hold the fault pattern.

5. A selector circuit according to claim 4, wherein on detection of a "line-to-ground" fault, said bias level is substantially raised to prevent load changes causing false selection and said predetermined fraction is substantially reduced to release the memory to allow detection of evolution of the "line-to-ground" fault to a "line-to-line" fault or a 3-phase fault.

6. A selector circuit according to claim 1, wherein the electrical quantities are the line-to-line currents.

7. A selector circuit according to claim 5, including a coincidence circuit having its input connected to the output of the fault identifying means and its output connected to the input of the memory and operative, when a "line-to-ground" fault is indicated and the fault pattern changes from a "line-to-ground" type to a "line-to-line" type, to enter the new fault pattern in the memory.

8. A selector circuit according to claim 5, including a logic circuit connected between the output from the fault identifying means and the input to the memory and operative, when a "line-to-ground" fault is indicated and the fault pattern changes to indicate another "line-to-ground" fault, to change the fault pattern in the memory to that indicating a "line-to-line" fault between the relevant two lines.

9. A selector circuit according to claim 1, including a set of excess current detector connected to the phases to indicate if the respective phase currents exceed a level at which the monitoring means begin to saturate, the fault pattern being replaced by the excess current pattern on any excess current being detected.

* * * * *